(12) United States Patent
Delisle (10) Patent No.: US 6,824,229 B1
(45) Date of Patent: Nov. 30, 2004

(54) NESTABLE GUIDE LUG FOR A TRACTION BAND

(75) Inventor: Marc Delisle, Drummondville (CA)

(73) Assignee: Soucy International Inc., Drummondville (CA)

( * ) Notice: Subject to any disclaimer, the term of this patent is extended or adjusted under 35 U.S.C. 154(b) by 0 days.

(21) Appl. No.: 10/440,146

(22) Filed: May 19, 2003

(51) Int. Cl.⁷ .............................................. B62D 55/205
(52) U.S. Cl. ..................... 305/157; 305/195; 152/209 B
(58) Field of Search ............................... 305/160, 165, 305/178, 173, 174, 176, 180, 157, 116, 195, 169, 199; 152/209 B (56) References Cited

U.S. PATENT DOCUMENTS

| | | | |
|---|---|---|---|
| 2,936,196 A | * | 5/1960 | Marcel et al. ............... 305/167 |
| 3,888,132 A | * | 6/1975 | Russ, Sr. ..................... 474/153 |
| 4,650,001 A | | 3/1987 | Ringgenberg |
| 5,190,363 A | | 3/1993 | Brittain et al. |
| 5,316,381 A | * | 5/1994 | Isaacson et al. ............ 305/145 |
| 5,320,585 A | | 6/1994 | Kato |
| 5,363,936 A | | 11/1994 | Grawey et al. |
| 5,447,365 A | | 9/1995 | Muramatsu et al. |
| 5,540,489 A | | 7/1996 | Muramatsu et al. |
| 6,000,766 A | * | 12/1999 | Takeuchi et al. ............ 305/160 |
| 6,530,626 B1 | * | 3/2003 | Benoit et al. ................ 305/157 |

* cited by examiner

Primary Examiner—Frantz F. Jules
(74) Attorney, Agent, or Firm—Robert Brouillette; Ronald S. Kosie; Gaétan Prince (57) ABSTRACT

This invention relates to the guide lugs of reinforced elastomeric endless traction bands, which are used on heavy vehicles like defence vehicles. More specifically, the invention relates to guide lugs which are partly nested into each other around the curved portion of the traction band in order to minimize de-tracking occurrences.

6 Claims, 9 Drawing Sheets

NESTABLE GUIDE LUG FOR A TRACTION BAND

FIELD OF INVENTION

This invention relates to the guide lugs of reinforced elastomeric endless traction bands, which are used on heavy vehicles like defence vehicles. More specifically, the invention relates to guide lugs to minimize de-tracking occurrences.

BACKGROUND OF THE INVENTION

The guidance of elastomeric traction bands is generally carried out with the help of protuberances, called guide lugs, which are periodically disposed on the interior surface of the traction band. In many cases, the guide lugs are lodged in the space defined in between a pair of split wheels. These wheels usually include the road wheels on which the vehicle rests, a sprocket wheel which ensures power transmission from the engine to the traction band and a tension wheel.

By engaging in those spaces, the guide lugs restrain the relative lateral movement of the traction band with respect to the wheels and keep the traction band in its normal operating position. For instance, see U.S. Pat. No. 5,540,489 (Muramatsu et al.), U.S. Pat. No. 5,447,365 (Muramatsu et al.), U.S. Pat. No. 5,320,585 (Kato) and U.S. Pat. No. 5,190,363 (Brittain).

To this day, the design of the guide lugs for endless elastomeric traction bands were based on guide lugs designs used in metallic traction bands. However, since an elastomeric material deforms more than steel, the guide lugs made with elastomeric materials have more tendency to deform and therefore increase the risk of de-tracking occurrences of the traction band. The studies we have conducted have shown that the de-tracking phenomenon is usually the result of an interference between the guide lugs as designed in the prior art and the road wheels. Essentially, the lateral deformation of the guide lugs allows the road wheels to "climb" from one side of the guide lug to the other side.

In order to remedy to this situation, the designers have generated different solutions. First, they have tried to rigidify the guide lugs by choosing more rigid elastomers and by reinforcing them With different types of fabric or structures. The designer also tried to increase the size of the guide lugs.

Secondly, the designers tried to limit the road wheel's tendency to climb on the guide lugs by lowering the friction coefficient between the wheel and the band, by developing specific elastomeric materials with low friction coefficient or by covering the guide lugs with a more slippery material (Teflon, UHMW-PE, etc.).

Those multiples attempts to diminish the de-tracking phenomenon have diminished these occurrences, but de-tracking remains a major problem for elastomeric traction bands when installed on heavy and fast vehicles like defence vehicles.

The main problem comes from the fact that it is impossible to significantly increase the size of the guide lugs. The lateral dimension (the width) of each guide lug is limited by the available space between the pair of split wheels. This spacing is unchangeable once the vehicle has been designed. The longitudinal dimension (the length) of the guide lugs is also limited by the fact that the traction band follows a circular path around the sprocket wheel and the tension wheel, which brings consecutive guide lugs closer to one another. The length of the guide lugs is therefore limited by the need to avoid contact or interference between two consecutive guide lugs in those areas.

SUMMARY OF THE INVENTION

The object of this invention is to define a new guide lug which significantly reduces de-tracking occurrences for a heavy vehicle.

This invention proposes nestable guide lugs which allow consecutive guide lugs to be brought closer to one another.

The nestable guide lugs also have a structure which allow a partial insertion of a guide lug portion into a portion of its neighboring guide lug around the curved portion of the traction band.

The nestable guide lugs permit:
1. To significantly reduce the lateral deformations of the guide lugs by maximizing the length of the guide lugs.
2. To significantly reduce the interference risk with the road wheels by generating an almost continuous wall which prevents the road wheels to climb or get in between two consecutive guide lugs.
3. To favor the reestablishment of the guidance when, in rare occasions, the guide lugs sufficiently deform and start interfering with the road wheels.

There is therefore provided a traction band made from an elastomeric material for a vehicle having a plurality of wheels, said band being adapted to be mounted on said wheels, and comprising a longitudinal axis, an external surface for cooperation with a ground surface and an inner surface, said inner surface comprising a series of guide lugs for cooperation with said wheels, each said guide lug having a front portion and a rear portion with respect to said longitudinal axis, said front portion and said rear portion of adjacent guide lugs being adapted to nest within each other when the traction band travels around some of said wheels.

Other aspects and many of the attendant advantages will be more readily appreciated as the same becomes better understood by reference to the following detailed description and considered in connection with the accompanying drawings in which like reference symbols designate like elements throughout the figures.

The features of the present invention which are believed to be novel are set forth with particularity in the appended claims.

DETAILED DESCRIPTION OF A PREFERRED EMBODIMENT

Figure 1:
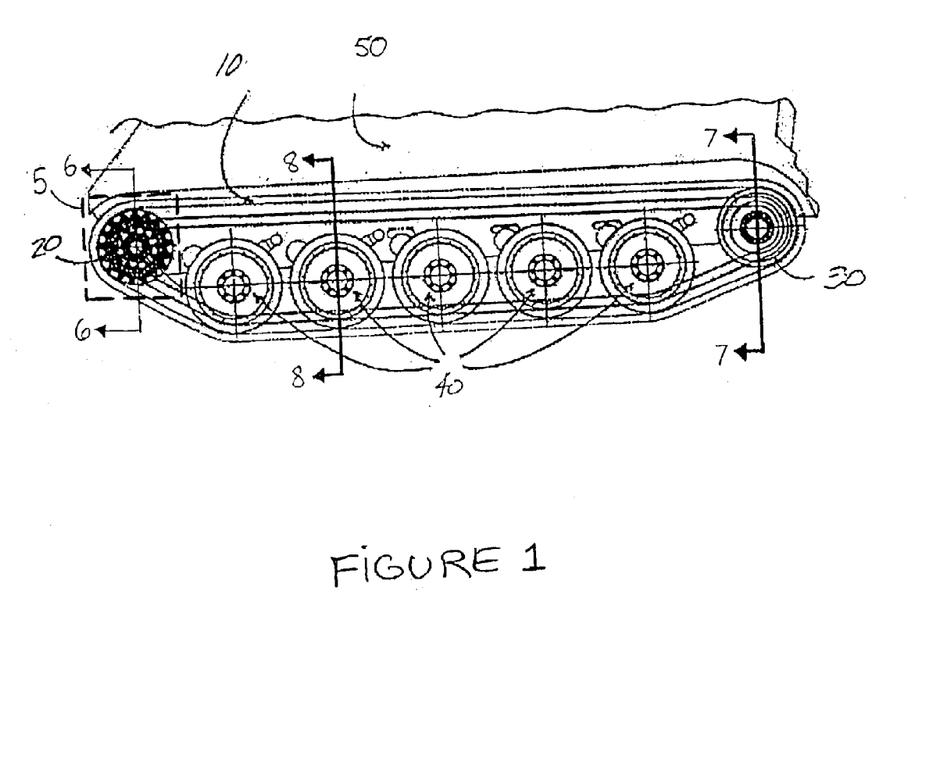
FIG. 1 is a general side view showing a traction band mounted on a defence vehicle.

FIG. 1 shows a typical traction band 10 which is installed on a defence vehicle 50. The traction band 10 is mounted around a plurality of road wheels 40, a sprocket wheel 20 and a tension wheel 30. When the traction band 10 is ready for operation, it is maintained in tension by the plurality of wheels 20,30,40, in a substantially linear contact with the plurality of road wheels 40 and in a substantially circular contact with the sprocket wheel 20 and tension wheels 30.

Figure 2:
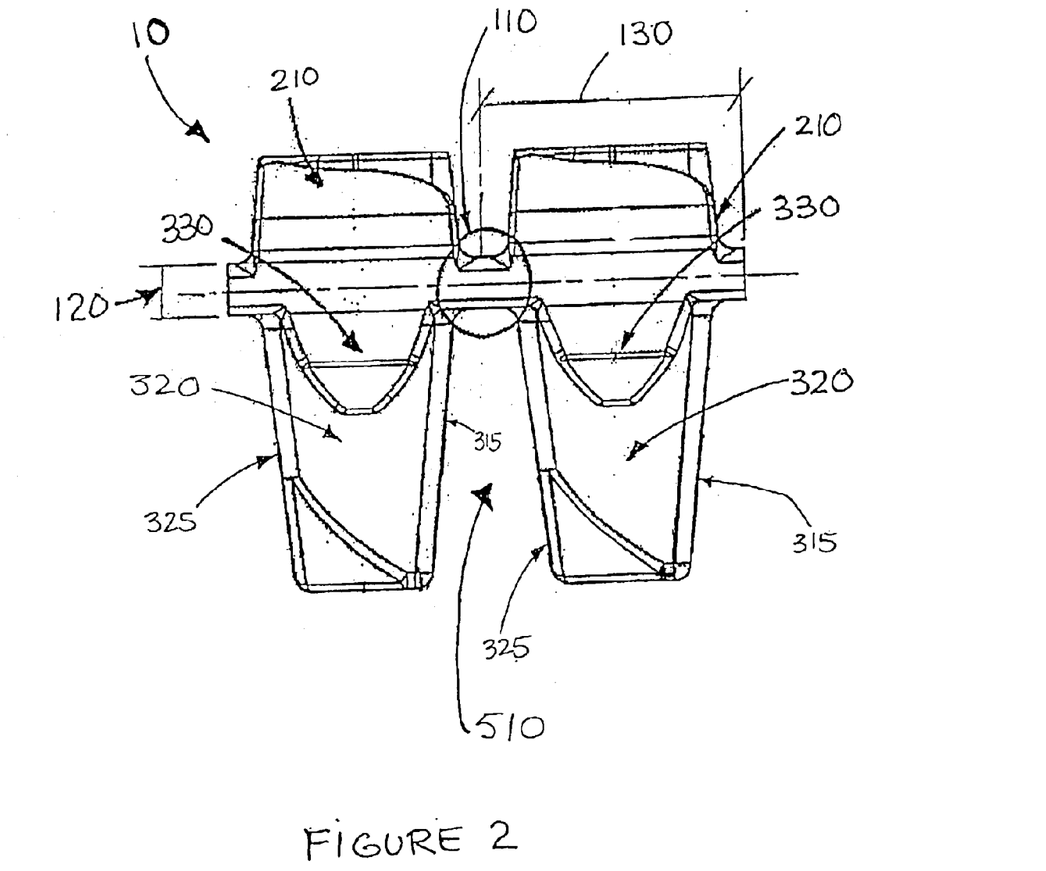
FIG. 2 is a side view showing the nestable guide lugs on an endless traction band in accordance with the invention.

As illustrated in FIG. 2, a typical traction band 10 is made from an endless elastomeric body 120, reinforced by embedded materials having different physical properties and various shapes (not shown). The guide lugs 320, the traction lugs 330 and the exterior profiles 210 are preferably repeated uniformly around the circumference of the traction band 10 at a specific pitch 130. Every consecutive pitches 130 are separated by a thinner portion 110 acting as a hinge in order to facilitate the rotation of the traction band 10 around the sprocket wheel 20 and tension 30 wheels.

Figure 5:
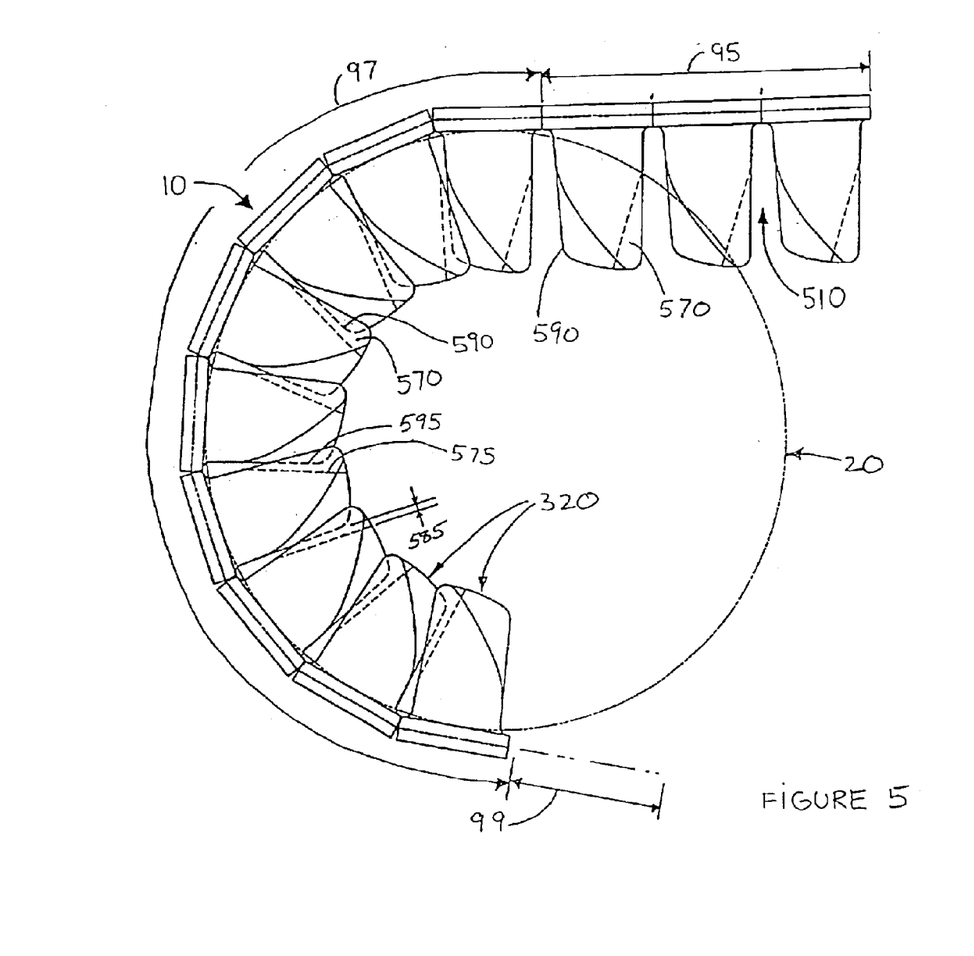
FIG. 5 is a detailed view taken from enclosure 5 in FIG. 1 showing the circular and linear movement of the guide lugs shown in FIG. 2.
Figure 6:
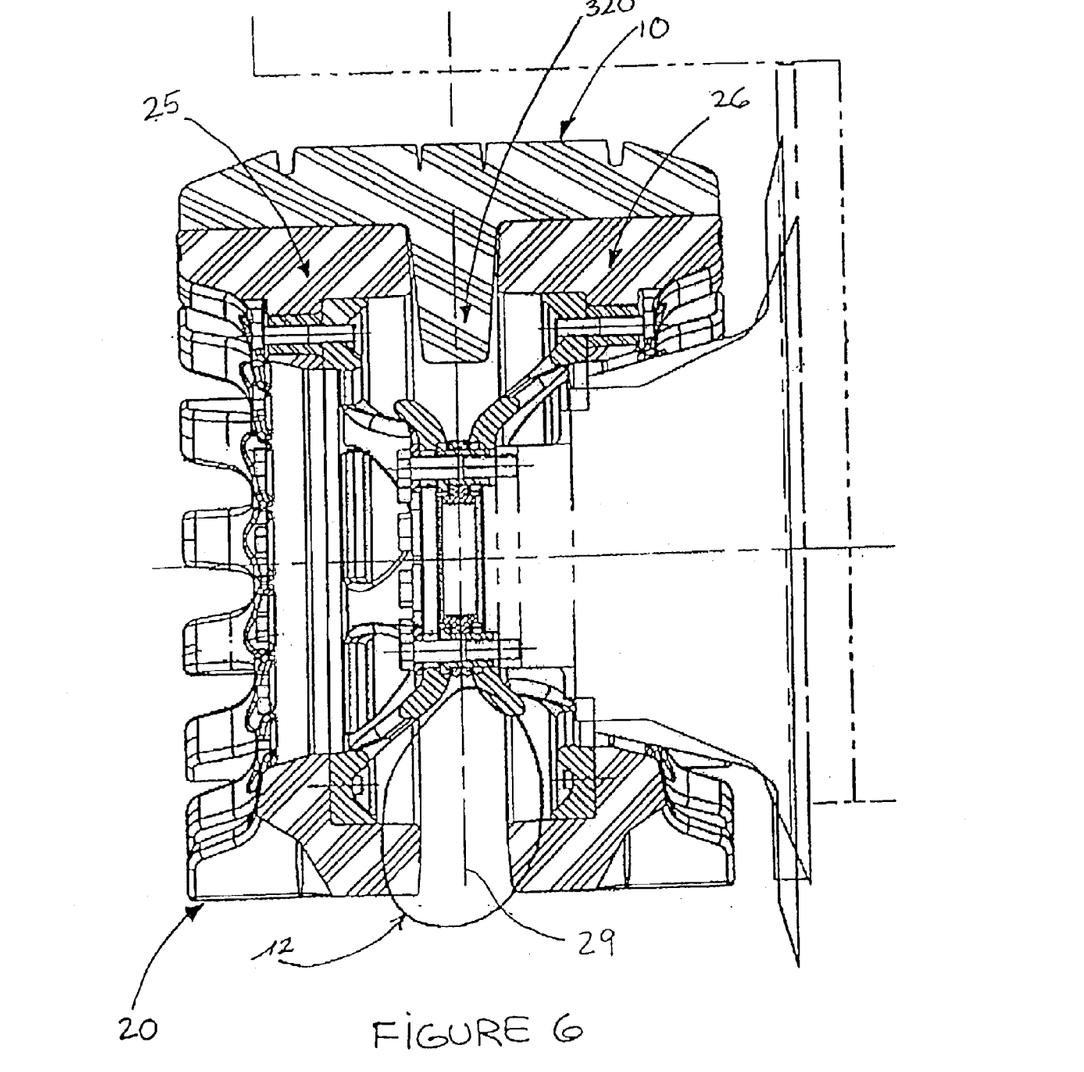
FIG. 6 is a section view taken from line 6—6 in FIG. 1 showing the cooperation between the sprocket wheel and the guide lugs shown in FIG. 2.
Figure 7:
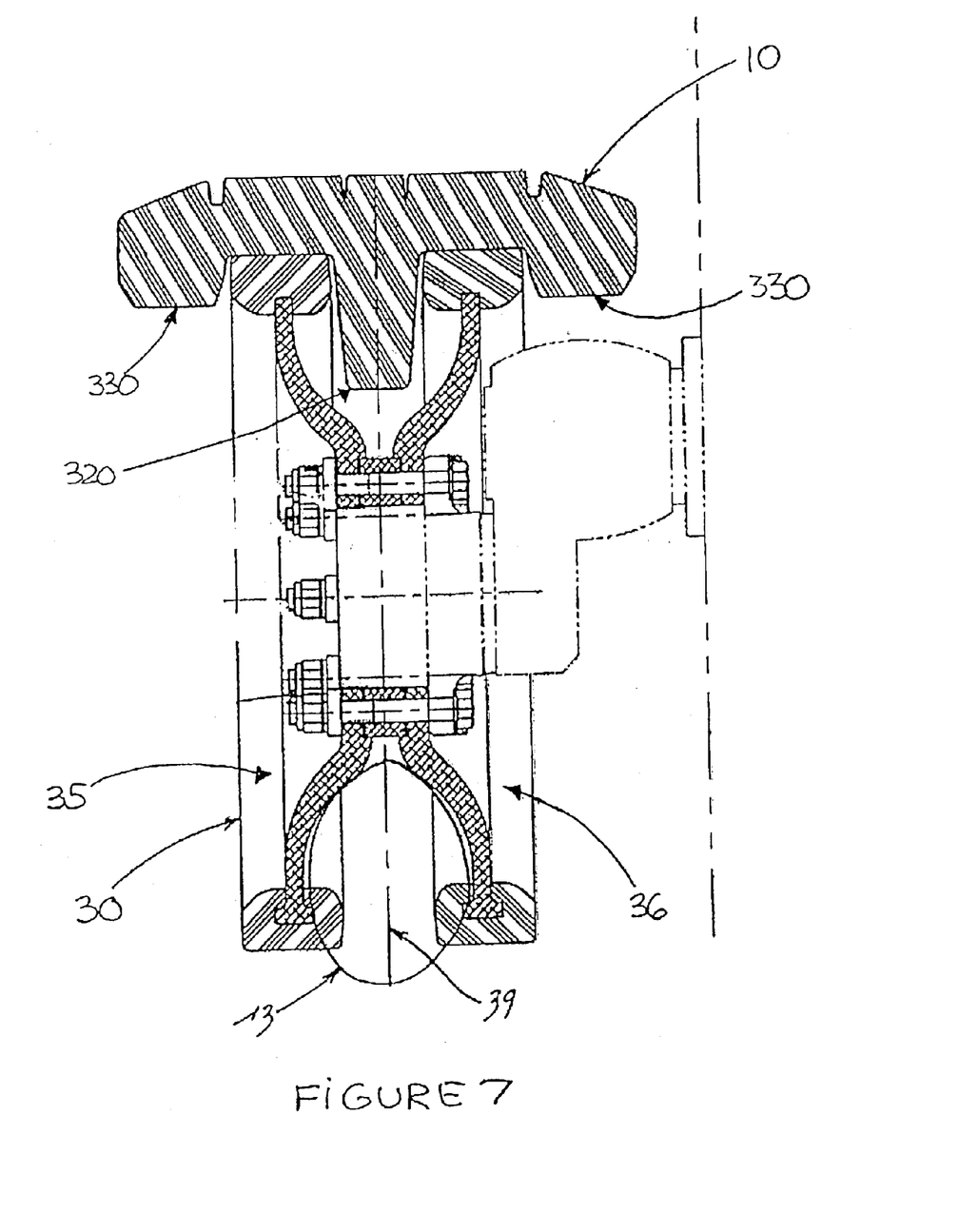
FIG. 7 is a section view taken from line 7—7 in FIG. 1 showing the cooperation between the tension wheel and the guide lugs shown in FIG. 2.
Figure 8:
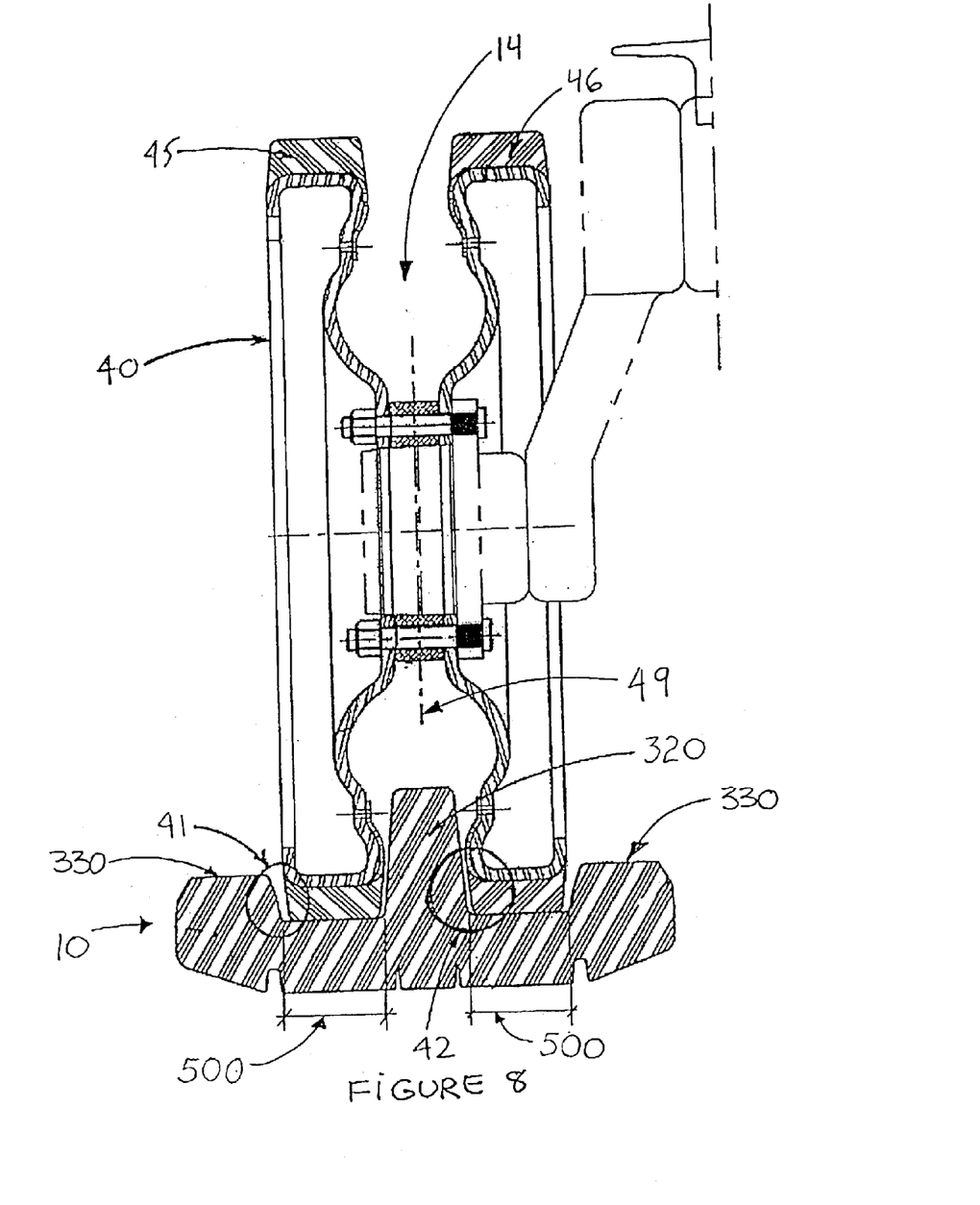
FIG. 8 is a section view taken from line 8—8 in FIG. 1 showing the cooperation between the road wheels and the guide lugs shown in FIG. 2.
Figure 9:
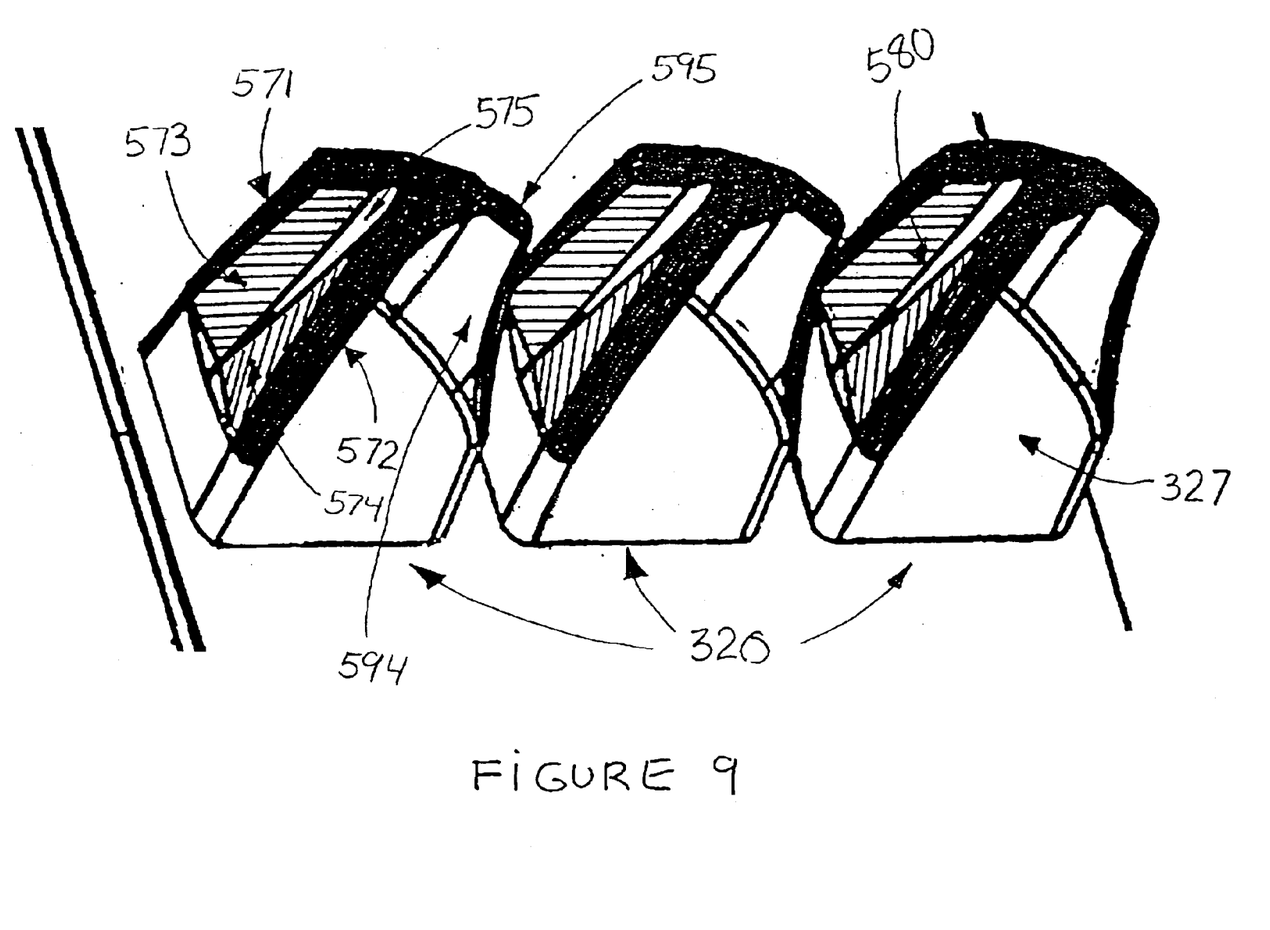
FIG. 9 is a detail view taken from enclosure 9 in FIG. 3 showing the nestable guide lugs.

The guide lugs 320 are protuberances located on and extending away from the inner surface of the traction band 10. As a whole, when viewed from a side view like in FIG. 5, they form some kind of a lateral wall around the circumference of the traction band 10. As shown in FIGS. 6, 7 and 8, the guide lugs 320 engage in throat spaces 12,13,14 of the sprocket wheel 20, the tension wheel 30 and of the plurality of road wheels 40. The localization of the guide lugs 320 in the spaces 12,13,14 allows the guidance and the lateral stability of the traction band 10 during the normal mode of operation of the vehicle 50.

The guide lugs 320 are preferably centered relative to the central axis 49,39,29 defined between each split pair (45 and 46, 35 and 36, 25 and 26) of the road wheels 40, tension wheel 30 and sprocket wheel 20. FIG. 8 shows lateral gaps 41,42 left between each wheels 40,30,20 and the traction band 10 to avoid interference as the wheels 40,30,20 roll on the flat rolling portions 500 of the band 10.

The guide lugs 320 are preferably located in the center of the traction band 10, along its longitudinal direction. When the band 10 is rotating around the sprocket wheel 20 or the tension wheel 30, the guide lugs 320 get closer to each other, such that the front 325 of one guide lug 320 approaches the rear 315 of the its neighboring guide lug 320. To avoid interference between the front 325 and the rear 315 of successive guide lugs 320, prior art traction bands provide a longitudinal gap 510 of a certain dimension.

Figure 3:
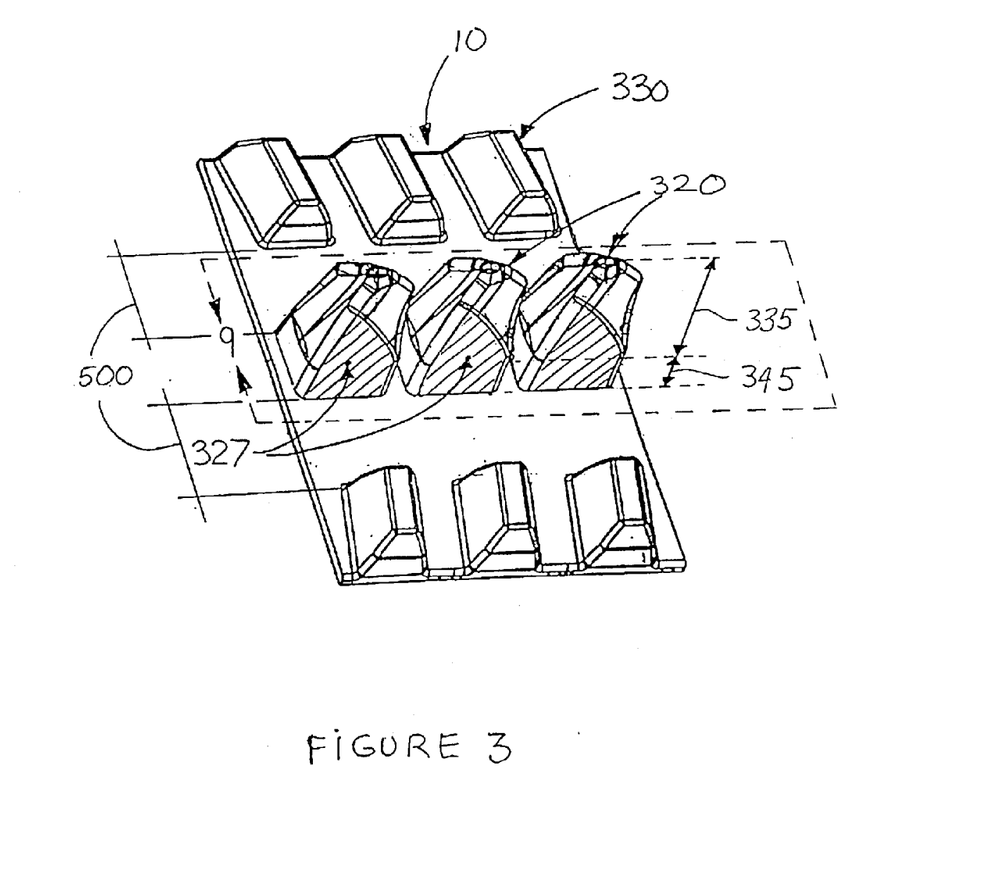
FIG. 3 is an isometric view showing the inner surface of the traction band equipped with the guide lugs shown in FIG. 2.

As seen in FIG. 3, the flat rolling portions 500 extend longitudinally along the circumference of the band 10 and preferably, on each side of the guide lugs 320 and next to the traction lugs 330. The plurality of road wheels 40 ride on those flat rolling portions 500, which at that moment in the rotation of the band 10 support the weight of the vehicle 50.

Figure 4:
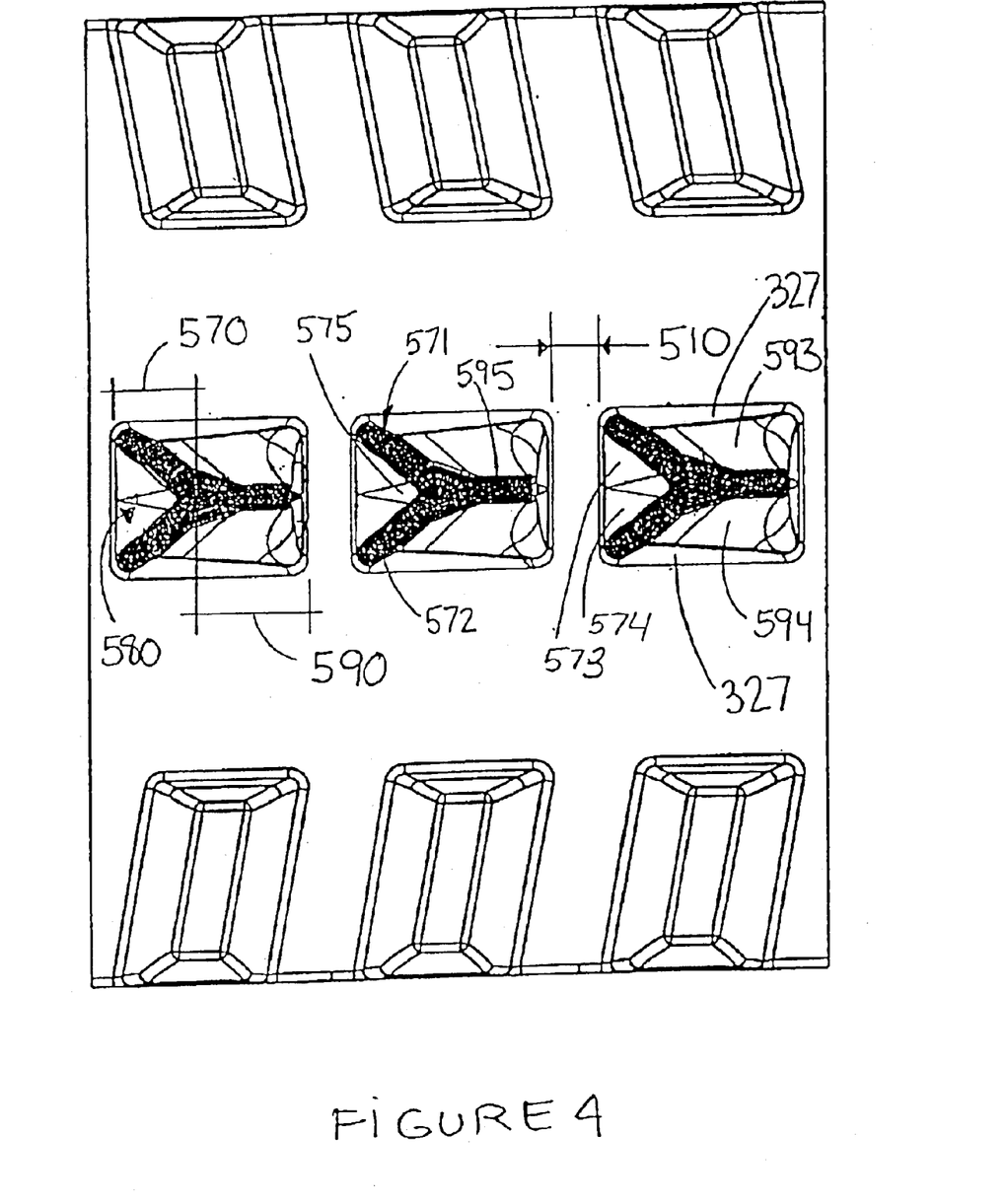
FIG. 4 is a top view showing the interior surface of the traction band equipped with the guide lugs shown in FIG. 2.

It has been found that de-tracking occurrences can be significantly reduced when the guide lugs 320 are designed with a particular geometrical shape. As shown in FIGS. 3, 4 and 5, the guide profiles 320 of the present invention are conceptualized in such a way that they maximize the guidance effect everywhere on the traction band 10.

To achieve this goal, the guide lugs 320 must offer the largest lateral support surfaces 327 to the road wheels 40 and minimize the longitudinal gap (510 in FIGS. 2,4 and 5) in order to provide a more continuous lateral wall than the prior art's bands, along the entire circumference of the traction band 10. However, it is not possible to completely remove the longitudinal gap 510, but the particular shape configuration of the guide lugs 320 allows to significantly reduce this gap 510. The only requirement in determining the gap 510 is to avoid interference between two consecutive guide lugs 320 when rotating around the sprocket wheel 20 (shown in details in FIG. 5) or the tension wheel 30.

De-tracking usually occur when the guide lugs 320 deform due to a high lateral load. In those instances, the top portions of the guide lugs 320 are moved away from their alignment with respect to the central axis (79 in FIG. 8) between each split pair 45,46 of road wheels 40. As the band 10 continues to rotate, the laterally deformed guide lugs 320 interfere with one of the split wheels 45,46 which in turn start "climbing" on the guide lugs 320.

In the present invention, shown into more details in FIGS. 3, 4, 5 and 9, the guide lugs are radially divided in an lower portion 345 and in a top portion 335. The top portion 335 comprises a rear portion 570 and a front portion 590 which define areas repeated along the circumference of the traction band 10, and which are designed to favor the cooperation between each consecutive guide lugs.

The rear portion 570 has rear edges 571,572, preferably in a V-shaped configuration. The rear edges 571,572 circumscribe a recess area 580 which, in this preferred embodiment, is generated by two angled sides 573,574 connected to a bottom recess 575. The recess area 580 is substantially a radially extending V-shaped groove.

The front portion 590 preferably has a central engaging edge 595. Two angled surfaces 593,594 taper from the engaging edge 595 toward the lateral support surfaces 327. The front portion 590 substantially has a radially extending tapered shape and preferably, a fin or sharpened shape.

Those portions 570, 590 are to be found at each pitch 130 of the band 10, since they are located on each guide lugs 320.

As seen in FIG. 5, the traction band 10 rotates around the sprocket wheel 20, but the same principles apply to the rotation of the band around the tension wheel 30. In the sprocket area, there is a transition between a linear motion 95 of the track 10, to a circular motion 97 when the band is in contact with the sprocket wheel 20, an then back to a linear motion 99.

For the circular motion 97, the guide lugs 320 get closer to one another, and by having the front 590 and rear portion 570 of consecutive guide lugs 320 nested within each other, the longitudinal gap 510 can be significantly diminished. In the nesting process, the engaging edge 595 engages in the rear portion 570, without interference with the recess area 580.

When the front portion 590 of one guide lug 320 is nested in the rear portion 570 of its adjacent guide lug 320, the front portion 590 is preferably oriented in a generally similar direction as the radially extending V-shaped groove of the rear portion 570, such that a circumferential gap 585 is maintained between the engaging edge 595 and the bottom recess 575.

Many advantages are obtained by forming the front portion 590 in a tapered shape:

1. The tapered front portion 590 facilitates the entry of the guide lugs 320 in the throat spaces 12,13,14 of the sprocket wheel 20, the tension wheel 30 and of the plurality of road wheels 40, with less risk of interference.

2. The lateral forces generated by the friction between the road wheels 40 and the prior art guide lugs produce a tendency to have the wheels 40 "climbing" on the guide lugs and cause de-tracking occurrences. With this invention, the tapered shaped front portion 590 of the guide lugs 320 helps stop the climbing and facilitates the sliding of the wheels 40 down on the lateral support surfaces 327 and back on the flat rolling portions 500 of the traction band 10. Therefore, the de-tracking events are significantly minimized.

Since the top portion 335 of the guide lugs 320 has a generally triangular cross-section, and therefore contains less material than the prior art lugs, a maximized contact surface must still be maintained in order to offer the most continuous and laterally rigid wall to ensure proper guidance to the wheels 40,30,20. This is why the lower portion 345 has been kept to its commonly known rectangular shape. A gradual transition is ensured between the top portion 335 and the lower portion 345.

Although a preferred embodiment of the invention has been described in detail herein and illustrated in the accompanying figures, it is to be understood that the invention is not limited to this precise embodiment and that various changes and modifications may be effected therein without departing from the scope or spirit of the present invention.

What is claimed is:

1. A traction band made from an elastomeric material for a vehicle having a plurality of wheels, said band being adapted to be mounted on said wheels, and comprising a longitudinal axis, an external surface for cooperation with a ground surface and an inner surface, said inner surface comprising a series of guide lugs for cooperation with said wheels, each said guide lug having a front portion and a rear portion with respect to said longitudinal axis, said front portion and said rear portion of the guide lugs being adapted to nest within each other when the traction band travels around some of said wheels, wherein each said guide lug has a radially extending upper portion and a radially extending lower portion, and wherein said upper portion of said front portion nests in said upper portion of said rear portion.

2. A traction band as claimed in claim 1, wherein said front portion has a tapered profile.

3. A traction band as claimed in claim 2, wherein said rear portion of one of said guide lugs comprises a recess area for the nesting of said front portion from adjacent said guide lug when said band rotates around one of said wheels.

4. A traction band as claimed in claim 1, wherein said upper portion of each said guide lug has a substantially triangular cross-section.

5. A traction band as claimed in claim 4, wherein said lower portion of each said guide lug has a substantially rectangular cross-section.

6. A traction band as claimed in claim 5, wherein there is a gradual transition between said lower portion and said upper portion.

* * * * *